INVENTORS
WILLIAM R. HEWLETT
HARALD T. FRIIS

BY R. C. Smith

ATTORNEY

United States Patent Office 3,260,936
Patented July 12, 1966

3,260,936
HIGH FREQUENCY IMPEDANCE BRIDGE UTILIZING AN IMPEDANCE STANDARD THAT OPERATES AT A LOW FREQUENCY
William R. Hewlett, Palo Alto, Calif., and Harald T. Friis, Rumson, N.J., assignors to Hewlett-Packard Company, Palo Alto, Calif., a corporation of California
Filed Apr. 24, 1964, Ser. No. 362,300
4 Claims. (Cl. 324—57)

This invention relates to a bridge circuit for measuring the complex impedance of an element at very high frequencies using an impedance standard in an arm of the bridge operating at a fixed low frequency. A bridge circuit of this type obviates the difficulties encountered in operating a variable impedance standard at very high frequencies.

It is an object of the present invention to provide a high frequency impedance bridge which uses an impedance standard that operates at a fixed low frequency for all values of high frequency at which measurements are made.

It is another object of the present invention to provide a bridge circuit which provides accurate indications of complex impedance measured at frequencies as high as several kilomegacycles per second.

It is still another object of the present invention to provide an improved impedance bridge circuit.

In accordance with the illustrated embodiment of the present invention, the element to be measured and a known resistor are serially connected to receive a high frequency signal. A sampler is connected to receive the high frequency signal for producing sample pulses at a selected rate having amplitudes related to the amplitude of the high frequency signal at each sample instant. The sampler stores the amplitude of each sample pulse for the period between successive sample pulses to form a stairstep output signal. This output signal is compared with a reference frequency in a phase detector which produces a voltage that controls the repetition rate of the sample pulses. Another known resistor and an impedance standard are serially connected to receive the stairstep signal appearing at the output of the sampler and occurring at the reference frequency. A second sampler is connected to receive the signal across the element to be measured for producing sample pulses at the same selected rate having amplitudes related to the instantaneous value of the signal across the element to be measured. A null detector is connected between the output of the second sampler and the common terminal of the serially-connected impedance standard and known resistor for providing an indication of bridge balance.

Figure 1:
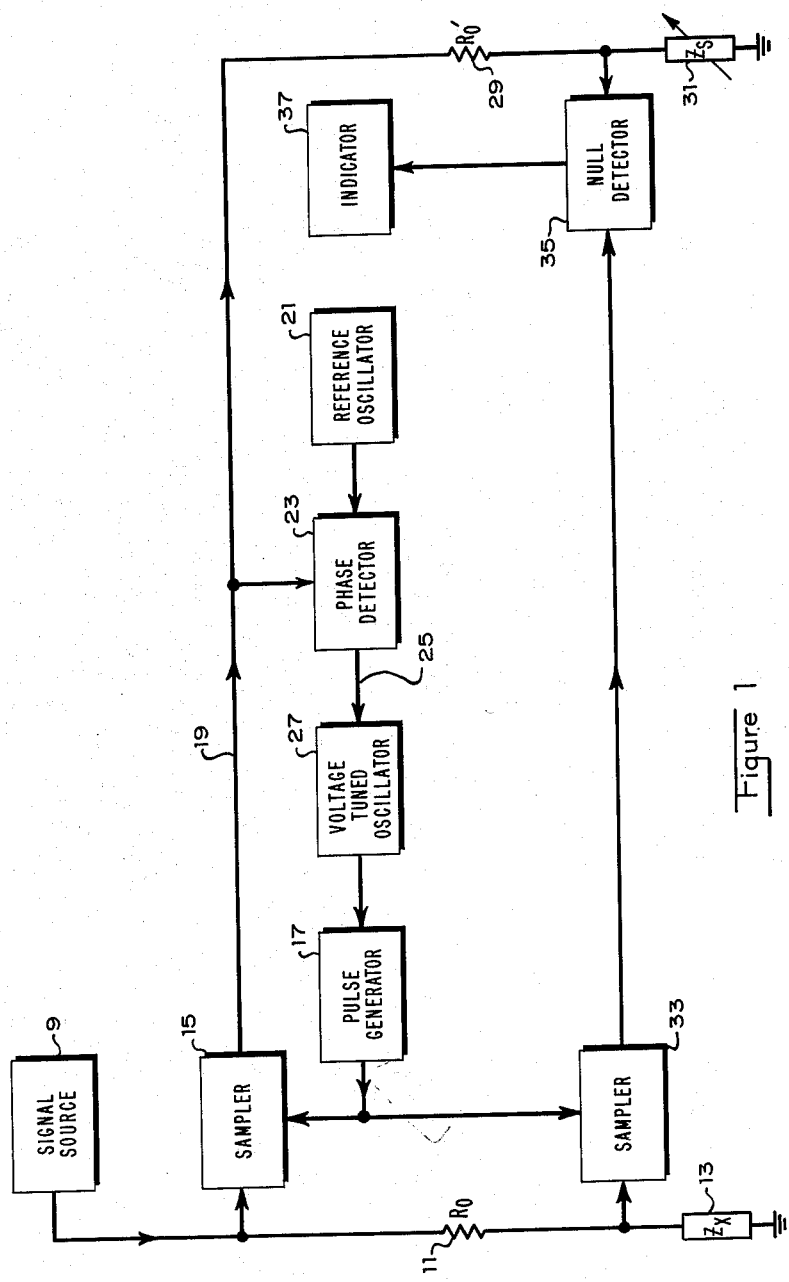
Figure 2:
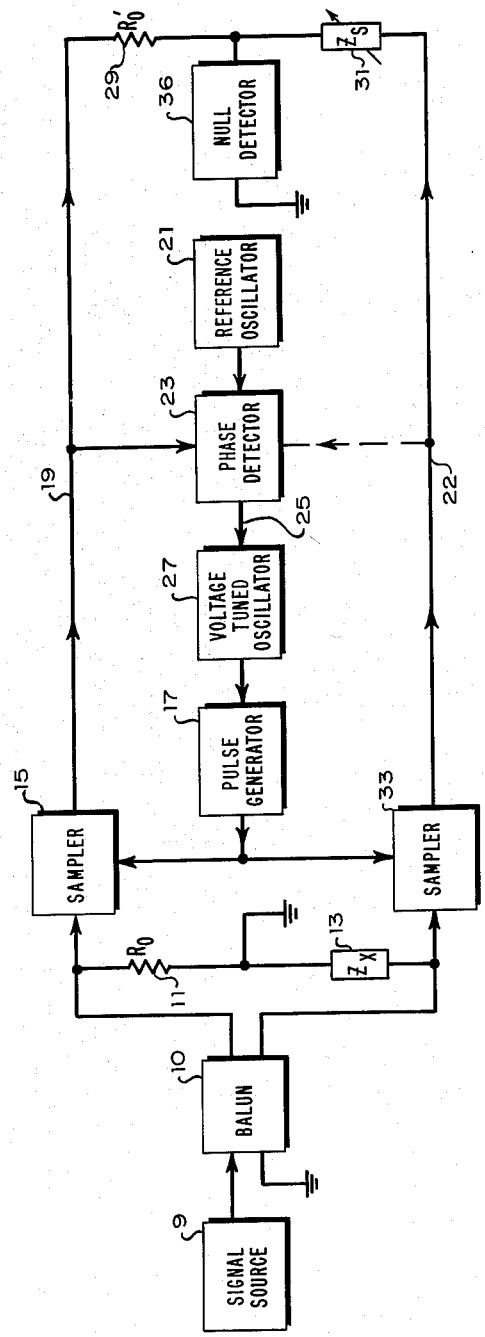

Other and incidental objects of the present invention will be apparent from a reading of this specification and an inspection of the accompanying drawing in which:

FIGURE 1 is a block diagram of one embodiment of the bridge circuit of the present invention which uses a balanced detector; and FIGURE 2 is a block diagram of another embodiment of the present invention which uses a balanced signal source.

Referring to FIGURE 1, signal source 9 is shown connected to the series circuit including resistor 11 and the element 13 to be measured. The sampler 15 is connected to receive the signal from source 9 and the pulses from generator 17 for producing sample pulses having the same repetition rate as the pulses from generator 17. These sample pulses have amplitudes which vary as the instantaneous value of the signal from source 9 varies at each occurrence of a pulse from generator 17. The sampler 15 stores the amplitude of each sample pulse for the period between successive sample pulses to form a stairstep output signal on line 19. This output signal is compared with the signal from reference oscillator 21 in the phase detector 23 which produces an output voltage on line 25 proportional to the phase relationship between the applied signals. This output voltage controls the frequency of oscillator 27 which, in turn, alters the repetition rate of the pulses from generator 17.

Phase lock is thus maintained between the signal from reference oscillator 21 and the fundamental component of the output signal produced by sample 15. The output of this phase-locked loop appears as a stairstep signal on line 19 having a waveshape similar to the waveshape of signal from source 9 and having a fixed frequency equal to the frequency of signal from oscillator 21 for all frequencies of signals from source 9. This fixed frequency output is applied to the serially connected resistor 29 and impedance standard 31. The standard 31 may thus be accurately calibrated at the fixed operating frequency (typically between 5 and 50 kilocycles per second) to insure highly accurate bridge measurements at all test frequencies.

A second sampler 33 is connected to receive the pulses from generator 17 and the signal drop across the element 13 to be measured. This sampler operates in the same manner as sampler 15, previously described, to produce a stairstep output signal having a fundamental frequency component which is related in phase and level respectively to the phase and level of the signal applied to the series combination of resistor 29 and impedance standard 31. A null detector 35 including an indicating device 37 such as a meter, oscilloscope or the like is connected between the common terminal of resistor 29 and standard 31 and the output of sampler 33 for providing an indication of bridge balance. The impedance standard 31, operating at a fixed frequency, may thus be adjusted until the amplitude and phase of the signal drop across it bears a predetermined relationship to the amplitude and phase of the fundamental component of the stairstep signal at the output of sampler 33. When this relationship is established, as shown by a null on indicator 37, the bridge is balanced and the complex impedance of element 13 may be determined from the known value of the impedance standard 31. The values of resistors 11 and 29 relative to the values of $Z_x$ and $Z_s$, respectively, determine the bridge sensitivity.

In FIGURE 2, the signal from source 9 is applied to the series circuit including resistor 11 and element 13 under test through a balun 10 (i.e. balance inverting transformer). This insures that the signal currents applied to the end of terminals of the series circuit are equal in amplitude and opposite in phase. The samplers 15 and 33 receive pulses from generator 17 and operate in the same manner as previously described to produce sample pulses which vary in amplitude as the instantaneous amplitude of the applied signals vary at each occurrence of a pulse from generator 17. Phase lock is established in the manner previously described between the signal from reference oscillator 21 and the fundamental component of the stairstep signal from sampler 15. Phase lock may also be established using the stairstep signal from sampler 33 where the signal on line 22 is larger than the signal on line 19 due to the relative values of resistor 11 and element 13.

The fundamental components of the stairstep signals from samplers 15 and 33 (equal to the frequenecy of reference oscillator 21) are applied to the end terminals of the series circuit including resistor 29 and impedance standard 31. The impedance standard 31 is adjusted until the bridge is balanced as indicated by a null on the null detector 36 connected between ground and the common terminal of the series circuit. The complex impedance of the element 13 under test may thus be determined from the known value of impedance standard 31.

We claim:

1. A measurement circuit comprising:
a source of trigger signals;
first and second samplers, each having a signal input and a trigger input and being connected to receive said trigger signals at said trigger input for producing an output signal having an amplitude related to the amplitude of a signal on said signal input at each occurrence of a trigger signal;
a source of test signal;
means connected to said source of test signal for applying the test signal to the element under test and to the signal input of the first sampler;
means connected to the signal input of the second sampler for applying thereto the signal appearing across the element under test;
a source of reference frequency;
means connected to said source of reference frequency and to the output of one of the first and second samplers for producing a control signal related to the phase relationship between the reference frequency and a selected frequency component of the variations in amplitude of the signal at the output of said one of the samplers;
means to apply said control signal to the source of trigger signals for altering the repetition rate thereof;
an impedance standard;
means connected to the output of at least one of said samplers for applying the signal appearing thereon to said impedance standard; and
means connected to said impedance standard for providing an indication related to the signal appearing thereacross.

2. A measurement circuit comprising:
a source of test signal;
means connected to apply said test signal to an element under test;
a source of trigger signals;
a first sampler having a signal input and a trigger input and being connected to receive said trigger signal at said trigger input for producing an output signal having an amplitude related to the amplitude of a signal on said signal input at each occurrence of a trigger signal;
means connected to the signal input of the first sampler for applying the test signal thereto;
a source of reference frequency;
means connected to the output of said first sampler and to the source of reference frequency for producing a control signal related to the phase relationship between the reference frequency and a selected frequency component of the variations in output signal amplitude;
means to apply said control signal to the source of trigger signals for altering the repetition rate thereof;
an impedance standard;
means connected to the output of said first sampler for applying the signal appearing thereon to said impedance standard;
a second sampler having a signal input and having a trigger input connected to the source of trigger signals for producing an output signal having an amplitude related to the amplitude of a signal on said signal input at each occurrence of a trigger signal;
means connected to the signal input of said second sampler for applying thereto the signal appearing across the element under test; and
means connected to the output of said second sampler and to said impedance standard for producing an indication of the relationship between the signal across said standard and a selected frequency component of the variations in amplitude of output signal from said second sampler.

3. A measurement circuit comprising:
a source of test signal;
a first series circuit including a resistor and an element under test connected to receive said test signal;
a source of trigger signals;
a first sampler having a signal input and having a trigger input connected to receive said trigger signals for producing and output signal having an amplitude related to the amplitude of signal on said input at each occurrence of a trigger signal;
means connecting said source of test signal to the input of said sampler;
a source of reference frequency;
a phase detector connected to the output of said first sampler and to the source of reference frequency for producing a control signal related to the phase relationship between the reference frequency and a selected frequency component of the variations in amplitude of output signal from the first sampler;
means to apply said control signal to the source of trigger signals for altering the repetition rate thereof;
an impedance standard;
a second series circuit including a resistor and said impedance standard connected to the output of said first sampler;
a second sampler having a signal input and having a trigger input connected to the source of trigger signals for producing an output signal having an amplitude related to the instantaneous amplitude of signal on said signal input at each occurrence of a trigger signal;
means connected to the signal input of the second sampler for applying thereto the signal appearing across said element under test; and
means connected to the output of said second sampler and to said impedance standard for producing an indication of the relationship between the signal across said standard and a selected frequency component of the variations in amplitude of output signal from said second sampler.

4. A measurement circuit comprising:
a source of trigger signals;
first and second samplers, each having a signal input and a trigger input and being connected to receive said trigger signals at said trigger input for producing an output signal having an amplitude related to the amplitude of a signal on said input at each occurrence of a trigger signal;
a signal source having a pair of outputs for producing a test signal of selected frequency and opposite polarity on said outputs;
a first series circuit including a resistor and an element under test;
means connected to the outputs of said signal source for applying the test signal to the end terminals of said series circuit;
means connecting the signal inputs of the first and second samplers to the outputs of the signal source;
a source of reference frequency;
means connected to said source of reference frequency and to the output of one of the first and second samplers for producing a control signal related to the phase relationship between the reference frequency and a selected frequency component of the variations in amplitude of the signal at the output of said one of the samplers;
means to apply said control signal to the source of trigger signals for altering the repetition rate thereof;
an impedance standard;
a second series circuit including a resistor and said impedance standard;
means connected to the outputs of said samplers for applying the signals appearing thereon to the end terminals of the second series circuit; and means connected to the common terminal of said resistor and element of the first series circuit and to the common terminal of said resistor and impedance standard of the second series circuit for providing an indication related to the signal appearing between said common terminals.

No references cited.

WALTER L. CARLSON, *Primary Examiner.*

E. E. KUBASIEWICZ, *Assistant Examiner.*